Sept. 1, 1936.  P. F. SHIVERS  2,052,947
VALVE OPERATING MECHANISM
Filed Jan. 2, 1932  3 Sheets-Sheet 2
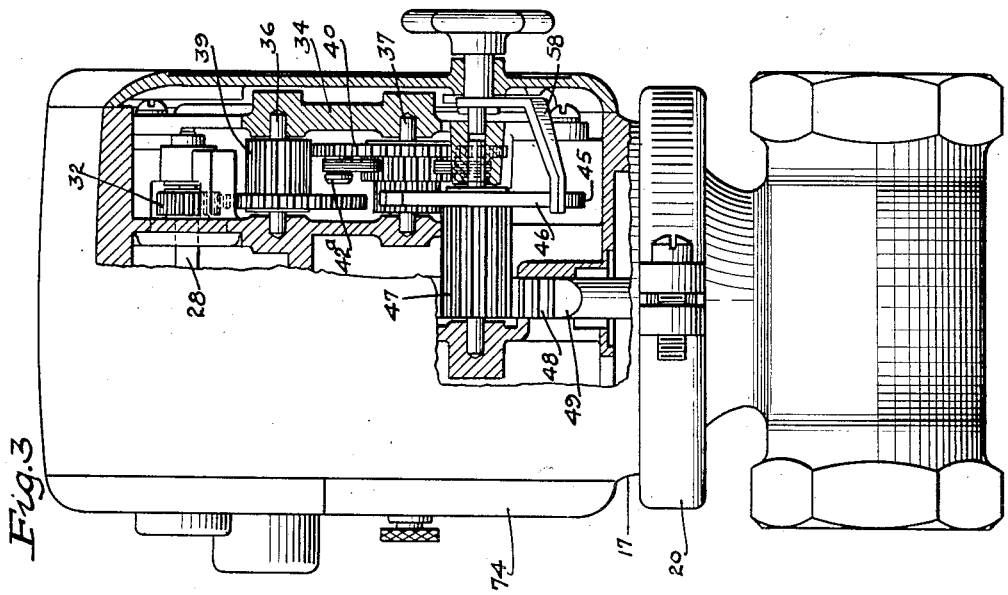
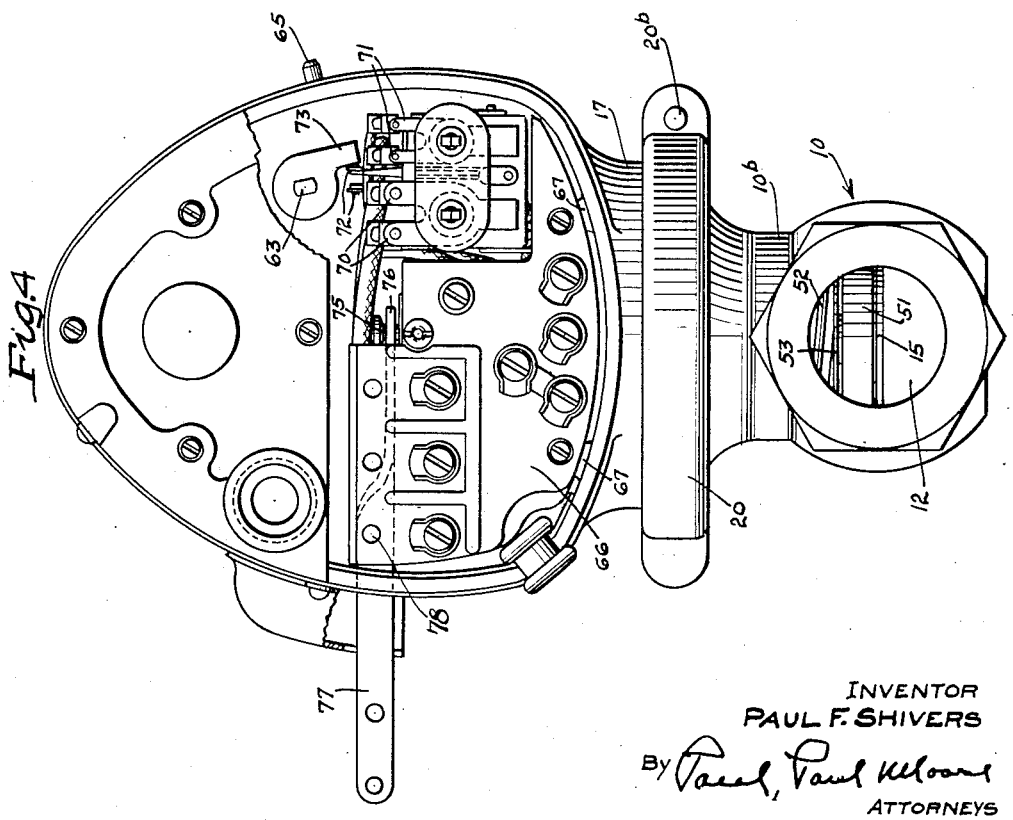
INVENTOR
PAUL F. SHIVERS
By
ATTORNEYS

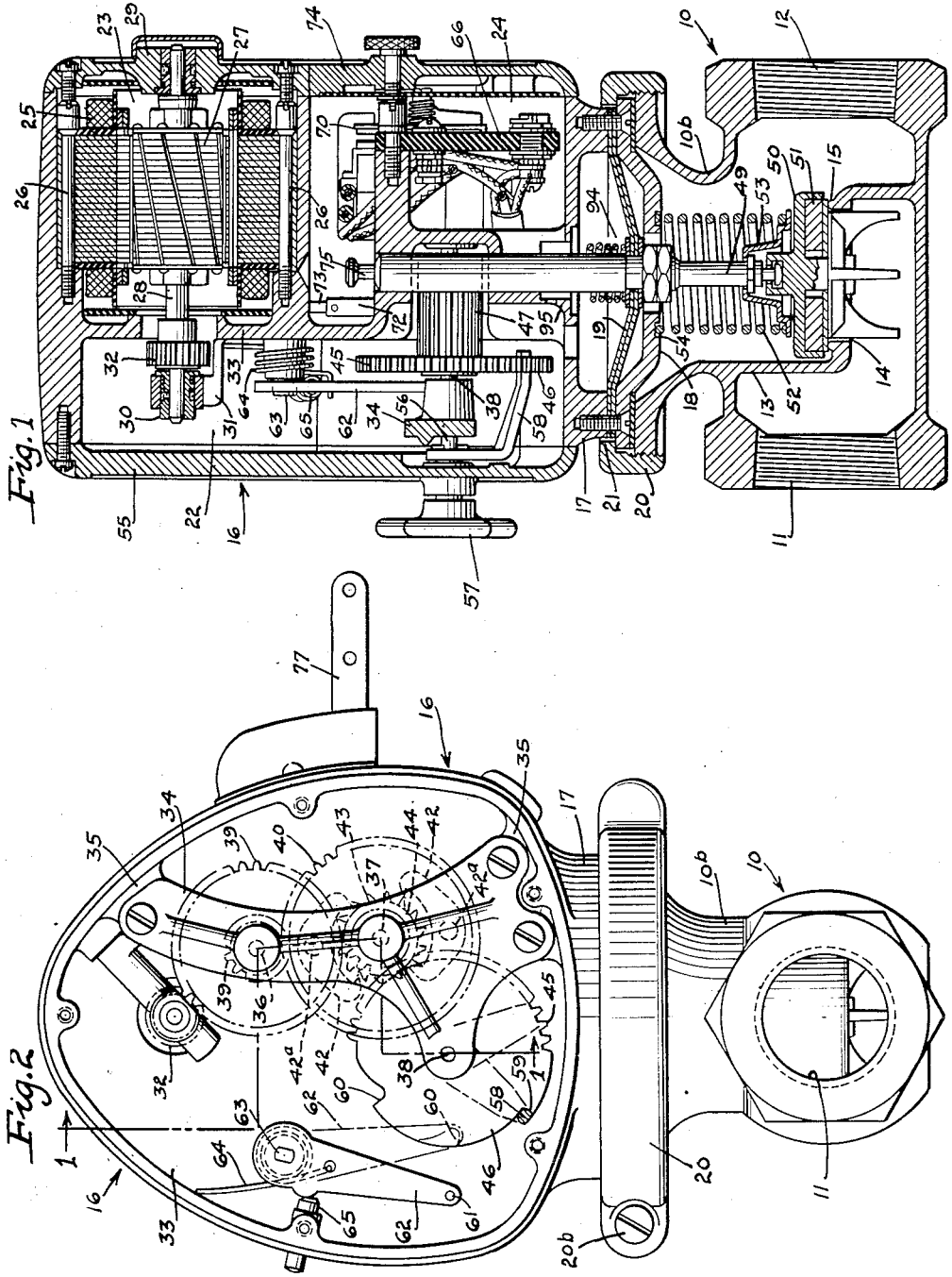

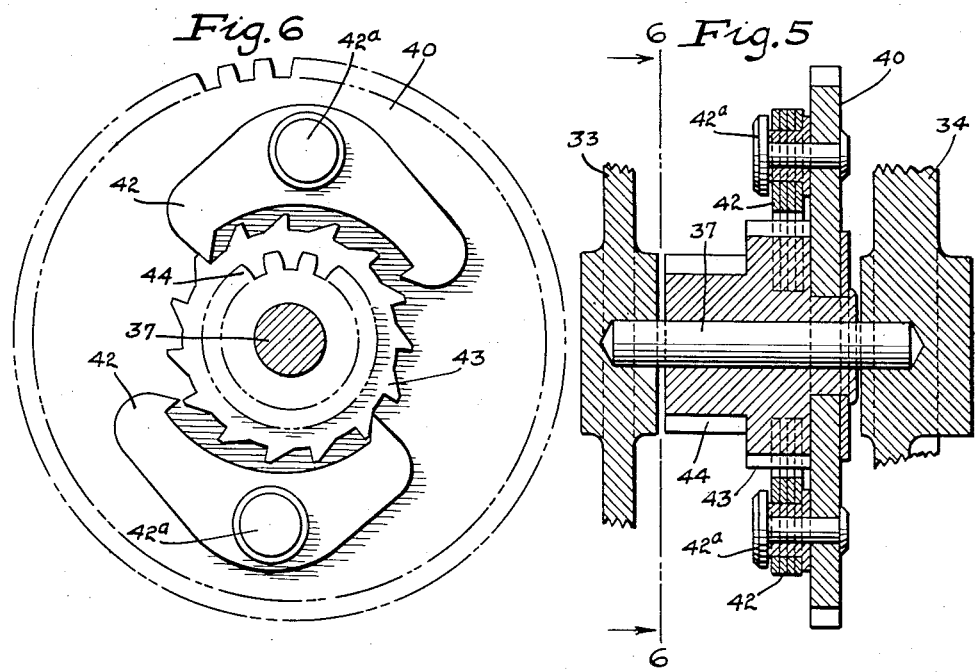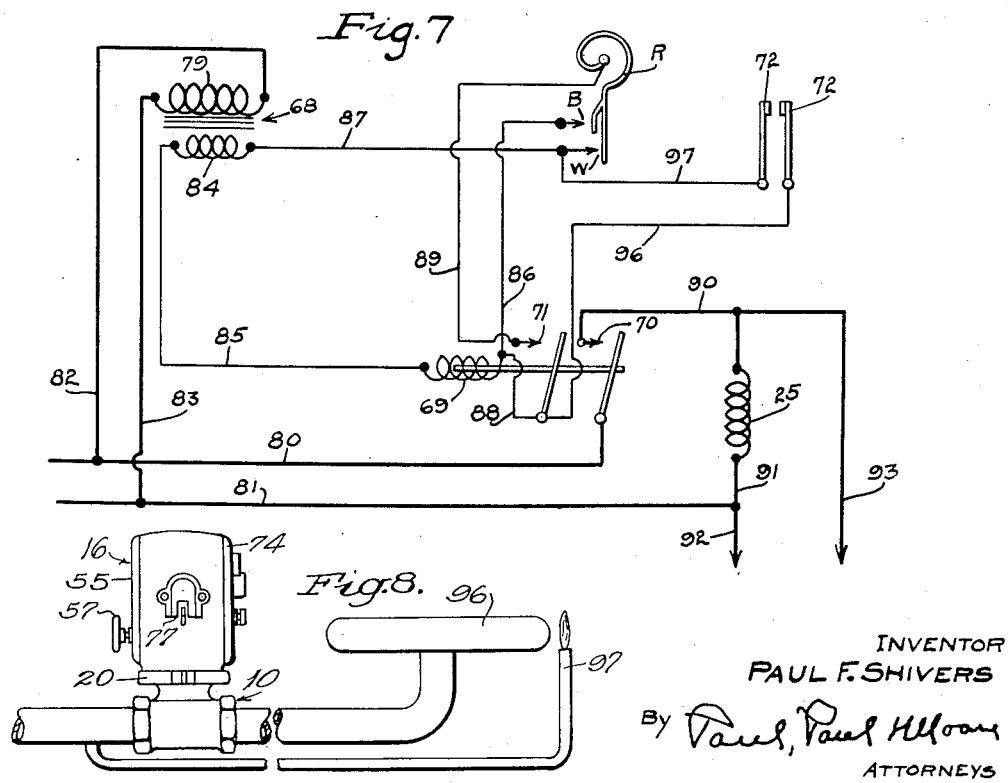

Patented Sept. 1, 1936

2,052,947

UNITED STATES PATENT OFFICE

2,052,947

VALVE OPERATING MECHANISM

Paul F. Shivers, Wabash, Ind., assignor to Minneapolis-Honeywell Regulator Company, Minneapolis, Minn., a corporation of Delaware Application January 2, 1932, Serial No. 584,510

17 Claims. (Cl. 137—139)

The present invention relates to motor operated valves in general and particularly to the type of valve shown in my prior Patent No. 1,678,202 which issued July 24, 1928.

In a valve which is normally biased to closed position by a spring and in which the power of the spring is overcome for opening the valve by a rotating motor and gear train which is operatively connected to the valve stem, it has been found that during closing movement of the valve, under the action of the spring, a large amount of momentum is built up. When the valve disc strikes the valve seat, there is a sudden stopping of the various gears and the motor, which causes the valve disc to bound back from the seat before coming to rest. These valves are often used to control the flow of gas to a burner and the rebounding of the valve disc causes an extra small amount of gas to go to the mixer which often results in a pop-back and consequent burning of the gas in the mixer. One of the objects of the present invention is to provide means for preventing rebounding of the valve disc from the valve seat in a construction where the valve in closing builds up a large amount of momentum.

Because of the momentum imparted to the rotating parts during closure of the valve, the valve disc is seated with a very sudden shock which promotes wear and tear on the valve seat, valve disc and associated parts. A further object of my invention is to provide disconnecting means which disconnect those parts in which the largest proportion of momentum and kinetic energy is built up, from the valve disc, whereby the valve disc may seat relatively easily and allow the other parts to keep on moving until the energy stored therein has been expended.

In carrying out these particular phases of the invention, the connection between the motor and valve is provided with a ratchet and pawl mechanism whereby the motor and associated parts are free to keep on moving after the valve has seated but will be in immediate operative connection with the valve when they are moved in valve opening direction.

Another object of the invention is the provision of improved means for opening the valve manually on power failure and latching the same in open position together with means for causing the valve to again be automatically controlled on resumption of power.

Other objects and features of the invention will become apparent as the description of the invention proceeds, it being remembered that only one embodiment is herein shown and described although the invention is capable of many modifications.

For a clear understanding of the invention, reference may be had to the following description and accompanying drawings, in which:

Fig. 1 is a vertical section through the housing and valve casing of a valve mechanism made in accordance with this invention;

Fig. 2 is a left elevation of the device shown in Fig. 1, the cover of the gear compartment being shown removed;

Fig. 3 is a partial section taken substantially on the line 3—3 of Fig. 2;

Fig. 4 is a right elevation, the cover for the electrical compartment being shown removed;

Fig. 5 shows a cross-section through the pawl and ratchet assembly;

Fig. 6 is a front view on line 6—6 of the assembly shown in Fig. 5;

Fig. 7 is a schematic diagram of the various circuits showing the manner in which the valve is adapted to be operated; and Figure 8 is a view in elevation similar to Figure 3 and showing a burner 96 attached thereto.

Referring to the drawings, a valve casing indicated at 10 is provided with an inlet opening 11, outlet opening 12, and a partition 13 therebetween which is provided with a valve opening 14, surrounded by a bead to form a valve seat 15. The valve casing is also provided with a cylindrical extension 10b provided with external screw threads. A main housing generally designated at 16 is provided with an annular flange 17 at its lower-most portion. A disc 18 clamps a sealing off diaphragm 19 to the flange 17. The main housing 16 is secured to valve casing extension 10b by means of a split nut 20 having a shoulder 21 which engages the edge of disc 18. After these parts are properly assembled split nut 20 is locked in position by tightening screw 20b.

The main housing 16 is divided into three compartments by suitable partitions and these compartments comprise a gear compartment 22, a motor compartment 23, and an electrical compartment 24. The field 25 of any suitable type of motor is secured in motor compartment 23 by means of screws 26. A motor rotor 27 is mounted on shaft 28, one end of which is journalled in a cover 29 for closing off the motor compartment 23. The other end of rotor shaft 28 extends into gear compartment 22 and is journalled in a bearing 30 which is mounted in an extension 31, of partition 33 which separates the compartments 22, 23 and 24. A pinion 32 is secured to rotor shaft 28 between bearing 30 and rotor 27. Partition 33 and a bracket 34 which is secured to projections 35 integral with the main housing 16 act as bearing members for shafts 36, 37, and 38. Shaft 36 carries a gear and pinion assembly 39, the gear of which meshes with pinion 32 and the pinion of which meshes with a gear 40 which is journalled on shaft 37. Gear 40 has a pair of pawls 42 pivotally secured thereto as shown at 42a and which cooperate with a ratchet wheel 43 integral with a pinion 44 also mounted on shaft 37. Pinion 44 meshes with teeth 45 which extend partially around the periphery of a disc 46 journalled on shaft 38. The teeth of a pinion 47 which is integral with disc 46 mesh with teeth 48 formed on a valve stem 49. Valve stem 49 passes through sealing-off diaphragm 19, and disc 18, and extends into the outlet chamber of valve casing 10. The lower end of valve stem 49 carries a valve disc retainer 50 in which is mounted a valve disc 51 adapted to engage valve seat 15. One end of a coil spring 52 abuts spring retaining member 53 carried by valve stem 49, and the other end of the coil spring rests in a groove 54 formed in disc 18.

Valve disc 51 is normally maintained in engagement with valve seat 15 by means of coil spring 52 and the valve may be opened and maintained open by energizing motor field 25 which causes rotation of rotor 27 and raising of valve stem 49 through the gear train above described. Upon deenergization of motor field 25 the valve is closed by means of the energy stored up in coil spring 52. Downward movement of valve stem 49 is transmitted back through the gear train and the motor rotor 27 causing these parts to rotate in a reverse direction. This type of valve is designed particularly for use in controlling the flow of gas wherein it is highly desirable that the valve be quickly closed. In Figure 8 such valve is shown in association with a burner 96 having a by-passed pilot 97. The coil spring 52 therefore is quite powerful, and considerable momentum is imparted to the gear train and motor rotor during closing movement. If the rotating parts were directly connected to the valve shaft 49, the suddenness with which the valve stem is stopped in its downward movement due to seating of valve disc 51 on valve seat 15 woud cause the parts to rebound resulting in a momentary re-opening of the passage between inlet 11 and outlet 12. The ratchet connection constituted by gear 40, pawls 42, and ratchet wheel 43, however, allows the gear train and motor rotor 27 to continue rotating after the valve has been seated until their inertia and momentum have been expended, thus avoiding momentary reopening of the passage between inlet 11 and outlet 12 when the valve moves to closed position. It is of course understood that the ratchet 43 is rotatable with respect to the gear 40 as clearly shown in Fig. 5.

A cover 55, provided for gear compartment 22, has journalled therein a shaft 56. A handle or manual operator 57 is secured to the outer end of shaft 56 on the outside of cover 55. One end of an angular lever 58 is secured to the inner end of shaft 56 and the free end of lever 58 is adapted to engage an abutment or projection 59 formed in disc 46 so that upon power failure the valve stem 49 may be raised by manual rotation of handle 57. In order to maintain the valve in open position against the action of coil spring 52 after manual rotation of handle 57, the disc 46 is provided with a notch or projection 60 which is adapted to receive a pin 61 carried by a lever 62. Lever 62 is secured to a shaft 63 which is journalled in partition 33 and is normally biased to the position shown in Figure 2 by means of a spring 64. A manually operable push button 65 extends through main housing 16 so that lever 62 may be moved against the bias of spring 64 to bring pin 61 into engagement with projection 60 after disc 46 has been rotated to valve opening position by manual operation of handle 57. With pin 61 in engagement with projection 60 the valve will be maintained in a partially opened position permitting substantially full flow of gas through valve opening 14, but allowing for a slight further rotation of disc 46 upon energization of motor field 25 for a purpose that will be brought out hereafter.

A terminal block 66 of any suitable insulating material is mounted in electrical compartment 24 by means of lugs 67 formed integral with main housing 16. Within this electrical compartment 24 there is mounted a transformer 68 (not shown in Fig. 4 but diagrammatically illustrated in Fig. 7) and also a relay having a coil 69 and controlling motor contacts 70 and holding contacts 71. A pair of normally open recycling contacts 72 are also mounted in electrical compartment 24 and are adapted to be closed by an arm of insulating material 73 which is secured to the inner end of shaft 63. A suitable cover 74 closes off the electrical compartment 24.

The upper end of valve stem 49 is provided with a reduced portion 75 adapted to be embraced by the bifurcated end 76 of a lever 77 which extends through the main housing 16 and is pivoted within the housing as shown at 78. Pivoted lever 77 may be used to operate another valve or damper in unison with valve 51 if desired.

Referring particularly to Fig. 7, the primary 79 of transformer 68 is connected to line wires 80 and 81 by conductors 82 and 83 respectively. In this particular instance the valve is shown as being controlled by a thermostat R which is adapted to sequentially close and open contacts W and B. Upon a call for heat by the room thermostat contacts W and B are closed, setting up the following energizing circuit for relay coil 69: secondary 84 of transformer 68, wire 85, relay coil 69, wire 86, contact B, contact W, and wire 87, back to secondary 84. Energization of relay coil 69 closes holding contacts 71 and motor contacts 70. Closure of contacts 71 establishes the following holding circuit for relay coil 69: secondary 84, wire 85, relay coil 69, wire 88, contacts 71, wire 89, thermostat R, contact W, and wire 87 back to secondary 84. Closure of motor contacts 70 energizes motor field 25 as follows: line 80, contacts 70, wire 90, field coil 25, and wire 91, back to line 81. If desired, motor contacts 70 may also control an external load circuit in parallel with motor coil 25 as indicated by leads 92 and 93.

Rotation of rotor 27 as a result of energization of field coil 25 is transmitted to valve stem 49 by means of the gear train previously described. When the valve is fully open, a coil spring 94 engages a wall 95 of main housing 16 causing the motor to be stalled. The valve is maintained in open position through stalling of the motor in the present instance, but it is obvious that other means could be employed for this purpose. As the room heats up, first contacts B and then contacts W are opened, de-energizing relay coil 69, whereupon motor contacts 70 return to open position by gravity. The power stored up in spring 52 immediately moves valve disc 51 into engagement with valve seat 15 and motor rotor 27 and the associated gear train are rotated rapidly in reverse direction. When the downward movement of valve stem 49 ceases because of engagement of valve disc 51 with valve seat 15 the motor rotor and associated gear train are allowed to continue rotating by means of the pawl and ratchet connection until their momentum is expended. The ratchet and pawl connection thereby prevents bouncing of the valve disc on the valve seat and immediately conditions the gear train for a valve opening operation.

In the event of power failure, the valve may be opened by rotation of handle 57 and maintained in substantially full open position by engagement of pin 61 with projection 60, resulting from manual inward movement of push button 65. The resulting rotation of shaft 63 causes arm 73 to close recycling contacts 72 and maintaining them in closed position. Upon a return of power, relay 69 is energized as follows: secondary 84, wire 85, relay coil 69, wire 88, wire 96, recycling contacts 72, wire 97, and wire 87 back to secondary 84. Motor energization follows, causing rotation of rotor 27 and associated gear train to move the valve to its full open position. This movement of disc 46 allows lever 62 to return to the position shown in Fig. 2 under the bias of spring 64. If the room is calling for heat at this time, the motor remains energized. If the room is not calling for heat, however, the circuit to relay coil 69 is broken at recycling contacts 72 when lever 62 returns to its normal position and the valve returns to closed position ready to be automatically operated in response to changes in room temperature.

From the foregoing, it will be evident that this invention provides means for preventing rebounding of the valve disc upon closing movement and also provides improved mechanism whereby the valve may be manually operated on power failure and will return to automatic control upon the resumption of power.

I claim as my invention:

1. A device of the class described, comprising in combination, a valve casing having an inlet and an outlet, a partition wall therebetween having a valve opening therein, a valve adapted to close said valve opening and biased to valve closing position, operating means movable in one direction for opening said valve against its bias, said valve moving the operating means in the opposite direction on movement of the valve to closed position due to its bias, the valve operating means having sufficient mass and being moved at such a rate of speed through a large enough range during valve closing movement that the resulting momentum would be sufficient to cause the valve to rebound from closed position upon reaching the same, and a connection between the valve and operating means for allowing unrestricted continued motion of the latter in valve closing direction after the valve has closed until all such momentum has been completely expended.

2. A device of the class described, comprising, in combination, a valve casing having an inlet and an outlet, a partition wall therebetween having a valve opening therein, a valve adapted to close said valve opening and biased to valve closing position, operating means movable in one direction for opening said valve against its bias, said valve moving the operating means in the opposite direction on movement of the valve to closed position due to its bias, the valve operating means having sufficient mass and being moved at such a rate of speed through a large enough range during valve closing movement that the resulting momentum would be sufficient to cause the valve to rebound from closed position upon reaching the same, and a connection between the valve and operating means for allowing unrestricted continued motion of the latter in valve closing direction after the valve has closed until all such momentum has been expended, said connection operating to reestablish a direct connection immediately upon movement of the operating means in valve opening direction.

3. A device of the class described, comprising a valve casing having an inlet and an outlet, a partition wall therebetween having a valve seat formed therein, a valve normally biased against the seat to obstruct fluid flow from the inlet to the outlet, a rotating actuator for the valve, a gear train between said actuator and valve whereby the latter may be opened against its bias by the former upon operative energization thereof, the bias of the valve being sufficient to close the valve and rotate the actuator and gear train in the reverse direction at such a speed and through a large enough range that the resulting momentum built up in the gear train and actuator would be sufficient to cause the valve to rebound from its seat upon striking the same, and means for preventing such rebounding of the valve from its seat due to the momentum thus imparted to the actuator and gear train during valve closing movement.

4. A device of the class described, comprising a valve casing having an inlet and an outlet, a partition wall therebetween having a valve seat formed therein, a valve normally biased against the seat to obstruct fluid flow from the inlet to the outlet, a rotating actuator for the valve, a gear train between said actuator and valve whereby the latter may be opened against its bias by the former upon operative energization thereof, the bias of the valve being sufficient to close the valve and rotate the actuator and gear train in the reverse direction at such a speed and through a large enough range that the resulting momentum built up in the gear train and actuator would be sufficient to cause the valve to rebound from its seat upon striking the same, and an over-running mechanism operatively associated with the actuator and gear train for allowing the same to continue rotating due to their momentum after the valve has seated until sufficient momentum has been expended to prevent rebounding of the valve from its seat.

5. A device of the class described, comprising a valve casing having an inlet and an outlet, a partition wall therebetween having a valve seat formed therein, a valve normally biased against the seat to obstruct fluid flow from the inlet to the outlet, a rotating actuator for the valve, a gear train between said actuator and valve whereby the latter may be opened against its bias by the former upon operative energization thereof, the bias of the valve being sufficient to close the valve and rotate the actuator and gear train in the reverse direction at such a speed and through a large enough range that the resulting momentum built up in the gear train and actuator would be sufficient to cause the valve to rebound from its seat upon striking the same, and an over-running mechanism operatively associated with the actuator and gear train for allowing the same to continue rotating due to their momentum after the valve has seated until all such momentum has been expended, said overrunning mechanism providing for movement of the valve immediately when the actuator is rotated in valve opening direction.

6. A device of the class described, comprising a valve casing having an inlet, an outlet, and a valve opening therebetween, a valve for closing said opening normally biased to obstruct the flow of fluid from the inlet to the outlet, a valve stem having teeth formed thereon, electrical rotating means, control means therefor, a gear train connecting said rotating means and the valve stem whereby the valve may be opened and closed in accordance with the condition of said control means, rotatable means for moving said valve to a substantially open position in the event of power failure, translatable means for latching said valve in the position to which it is moved by said rotatable means, and means placed in a condition upon operation of said latching means wherein it is effective immediately upon power restoration to release said latching means whereby said valve is returned to the control of said control means.

7. A device of the class described, comprising a valve casing having an inlet, an outlet and a valve opening therebetween, a valve normally biased to close the valve opening, a rotatable actuator, a gear train connecting the valve and actuator, said gear train including a disc having teeth on part of its periphery and two projections, a manually rotatable member adapted to engage one of said projections whereby the valve may be opened independently of the rotatable actuator, and a manually operable lever adapted to engage the second projection to maintain the valve open.

8. A device of the class described, comprising a valve casing having an inlet, an outlet and a valve opening therebetween, a valve normally biased to close the valve opening, a rotatable actuator, a gear train connecting the valve and actuator, said gear train including a ratchet and pawl mechanism whereby rotation of the actuator in one direction opens the valve against its bias, closing movement of the valve rotates the actuator and gear train in the opposite direction, and upon seating of the valve, the actuator continues rotation in valve closing direction until its momentum is expended, the actuator and gear train having sufficient mass and being moved by the bias at such a rate of speed through a large enough range during valve closing movement that the resulting momentum would be sufficient to cause the valve to rebound from its seat upon striking the same, if said valve were positively connected to said actuator.

9. In combination, a valve, a valve stem for operating said valve, means biasing said valve to a first fluid flow controlling position, an electrical actuator, means including a gear train for connecting said valve stem and said actuator whereby the actuator may move the valve to a second position against the action of said biasing means, a control member normally in control of said electrical means, means for manually operating said valve in the event of power failure, said means comprising a member adapted to engage an element of said gear train to retain said gear train and accordingly said valve in an intermediate position against the action of said biasing means, and means actuated upon operation of said manual operating means to assume a condition wherein it is effective to automatically and substantially immediately place said electrical actuator under the control of the control member upon resumption of power irrespective of the condition of the control member.

10. A device of the class described, comprising, in combination, a fluid flow casing having an opening therein, a fluid flow controlling element biased to seat upon said casing to obstruct the flow of fluid therethrough, an electrical actuator, a reduction gear train connected to the actuator, an over-riding connection between the reduction gear train and the fluid flow controlling element whereby the latter may be moved to a non-obstructing flow position upon operative energization of the actuator, the bias of said fluid flow controlling element being sufficient to seat the same upon said casing and rotate the reduction gear train in the reverse direction at such a speed and through such a range that the resulting momentum would cause the fluid flow controlling element to rebound from its flow obstructing position, said over riding connection permitting continued rotation of the reduction gear train after the fluid flow controlling element has seated until such momentum in the gear train is substantially expended whereby rebounding of the fluid flow controlling element is prevented, a housing inclosing the actuator and reduction gear train, means manually operable from without the housing and independent of said actuator for moving the fluid flow controlling element to an intermediate flow position and maintaining it therein against its bias upon a power failure, and means operated by said last named means for restoring the device to automatic control when power is resumed.

11. A device of the class described, comprising, in combination, a valve casing having an inlet port and an outlet port, a partition wall therebetween having an opening therein, a valve biased to seat on said partition to close the opening, a rotary electrical motor, a reduction gear train connected to the motor, an over-riding connection between the reduction gear train and valve whereby the latter is moved to open position against its bias upon operative energization of the motor, the bias of said valve being sufficient to move the valve to closed position and rotate the reduction gear train in reverse direction at such a speed and through such a range that the resulting momentum thereof would be sufficient to cause the valve to rebound from the partition after seating upon the same, the over-riding connection permitting continued rotation of the reduction gear train after the valve has seated until substantially all such momentum has been expended, a housing enclosing the motor and reduction gear train, means manually operable from without the housing for moving the valve to an intermediate position and maintaining it therein independently of the motor on power failure, and means operated by said last named means for restoring the device to automatic control when power is restored.

12. In combination, a fluid flow controlling element, means biasing said element in one direction to a first position, an electrical actuator, means connecting said element and actuator whereby the actuator may move the element in the opposite direction to a second position upon energization of said actuator, the biasing means being sufficient upon deenergization of said actuator to move said actuator in the first named direction at such a speed and through a large enough range that the resulting momentum would cause said element to rebound from said first position said connecting means enabling unrestricted relative movement between the two upon return of the element to the first position thereby to prevent a rebound thereof, a control member normally in control of said electrical means, mechanism for manually setting the fluid flow controlling element in a position other than said first position upon the occurrence of a power failure, and means for automatically and substantially immediately placing said electrical means under the control of the control member upon resumption of power irrespective of the condition of the control member.

13. In combination, a fluid flow controlling element, means biasing said element to a first position, an electrical actuator, means connecting said element and actuator whereby the actuator may move the element to a second position, a control member normally in control of said electrical means, and mechanism for manually operating the fluid flow controlling element upon the occurrence of power failure, said mechanism comprising means including a slidably mounted push button for engaging an element of said means connecting said fluid flow controlling element and actuator to maintain said connecting means and consequently said fluid flow controlling element in an intermediate position.

14. In combination, a fluid flow controlling element, means biasing said element to a first position, an electrical actuator, means connecting said element and actuator whereby the actuator may move the element to a second position, a control member normally in control of said electrical means, mechanism for manually operating the fluid flow controlling element upon the occurrence of power failure, said mechanism comprising means including a slidably mounted push button for engaging an element of said means connecting said fluid flow controlling element and actuator to maintain said connecting means and consequently said fluid flow controlling element in an intermediate position, and means controlled by said push button for automatically and substantially immediately placing said electrical means under the control of the control member upon resumption of power irrespective of the condition of the control member.

15. In combination, a valve, means biasing said valve in one direction to a closed position, a power operated actuator, means connecting said valve and said actuator whereby the actuator upon power being supplied thereto will move the valve in the opposite direction to open position against the action of said biasing means, said connection comprising two elements between which there is a one way connection so that upon deenergization of said actuator, continued movement of the same in said first named direction is possible, and means for manually opening said valve in the event of power failure comprising means associated with an element of said connecting means between said valve and said one way connection to permit manual movement of said element of said connecting means and consequently said valve towards open position without movement of said actuator.

16. In combination, a valve, means biasing said valve in one direction to a closed position, a power operated actuator, means connecting said valve and said actuator whereby the actuator upon power being supplied thereto will move the valve in the opposite direction to open position against the action of said biasing means, said connection comprising two elements between which there is a one way connection so that upon deenergization of said actuator, continued movement of the same in said first named direction is possible, and means for manually opening said valve in the event of power failure comprising manually operated latching means associated with an element of said connecting means between said valve and said one way connection to latch said element of said connecting means and consequently said valve in valve open position without latching said actuator.

17. In combination, a fluid flow controlling element, means biasing said element to a first position, an electrical actuator, means connecting said element and actuator whereby the actuator may move the element to a second position, said means comprising a plurality of elements between two of which there is a one way connection enabling a relative movement between the actuator and the fluid flow controlling element upon return of the fluid flow controlling element to the first position thereby to prevent a rebound thereof, a control member normally in control of said electrical means, mechanism for manually operating the fluid flow controlling element upon the occurrence of power failure, said mechanism comprising maintaining means including a slidably mounted push button for engaging an element of said connecting means between said one way connection and said fluid flow controlling element to maintain said fluid flow controlling element in an intermediate position, and means controlled by said push button for automatically and substantially immediately placing said electrical means under the control of the control member upon resumption of power irrespective of the condition of the control member.

PAUL F. SHIVERS.